United States Patent [19]

Kanno

[11] Patent Number: 5,790,262

[45] Date of Patent: Aug. 4, 1998

[54] IMAGE PROCESSING DEVICE CAPABLE OF REPRODUCING A BOOK DOCUMENT

[75] Inventor: Hiroshi Kanno, Shiroishi, Japan

[73] Assignee: Tohoku Ricoh Co., Ltd., Miyagi-ken, Japan

[21] Appl. No.: 850,864

[22] Filed: May 2, 1997

Related U.S. Application Data

[63] Continuation of Ser. No. 207,203, Mar. 8, 1994, abandoned.

[30] Foreign Application Priority Data

May 18, 1993 [JP] Japan ............................ 5-115567

[51] Int. Cl.$^6$ ................. H04N 1/04; H04N 1/387; G03B 27/32; G03B 21/00
[52] U.S. Cl. ................. 358/296; 358/452; 358/453; 358/474; 355/25; 399/187; 399/189; 399/362
[58] Field of Search ................. 358/296, 298, 358/406, 443, 444, 448, 452, 453, 464–466, 474, 486, 488, 494, 497, 498; 355/25, 47, 52, 77; 399/32, 45, 182, 183, 187, 189, 193, 196, 204, 362

[56] References Cited

U.S. PATENT DOCUMENTS

| | | | |
|---|---|---|---|
| 3,834,807 | 9/1974 | Fuller et al. | 355/231 |
| 4,229,768 | 10/1980 | Kurahayashi et al. | 358/443 X |
| 4,365,885 | 12/1982 | Nishikawa | 355/231 |
| 4,540,269 | 9/1985 | Nishiyoma | 355/231 |
| 4,707,745 | 11/1987 | Sakano | 358/298 X |
| 4,811,047 | 3/1989 | Hosaka et al. | 355/218 X |
| 4,855,933 | 8/1989 | Kondo | 382/258 X |
| 4,916,489 | 4/1990 | Takeda et al. | 355/218 X |
| 4,947,158 | 8/1990 | Kanno | 340/747 |
| 4,990,956 | 2/1991 | Iwata | 355/218 |
| 5,032,712 | 7/1991 | Ito | 358/486 |
| 5,122,833 | 6/1992 | Sato | 355/230 X |
| 5,390,033 | 2/1995 | Bannei et al. | 358/498 |

FOREIGN PATENT DOCUMENTS

| | | | |
|---|---|---|---|
| 62-146071 | 6/1987 | Japan | H04N 1/40 |
| 3 261270 | 11/1991 | Japan | H04N 1/387 |
| 4-65973 | 2/1992 | Japan | H04N 1/40 |

*Primary Examiner*—Eric Frahm
*Attorney, Agent, or Firm*—Oblon, Spivak, McClelland, Maier & Neustadt, P.C.

[57] ABSTRACT

In a device for processing a signal representative of a document image from a document reading unit to thereby reproduce the document image, a first comparator binarizes a multilevel image signal from the document reading unit with a first threshold value to thereby output a first bilevel image signal. A second comparator binarizes the multilevel image signal with a second threshold value to thereby output a second bilevel image signal. An area discriminating circuit outputs, in response to the second bilevel image signal, an area discriminate signal representative of the inside and or outside of an image area of the document image. An area separating circuit outputs, in response to the area discriminate signal and first bilevel image signal, an image signal representative of only an image portion of the first bilevel image signal which corresponds to the area discriminate signal. The device is capable of reproducing both a sheet document and a book document accurately.

23 Claims, 5 Drawing Sheets

→ SUBSCAN

Fig. 4B

→ SUBSCAN

IMAGE PROCESSING DEVICE CAPABLE OF REPRODUCING A BOOK DOCUMENT

This application is a Continuation of application Ser. No. 08/207,203, filed on Mar. 8, 1994, now abandoned.

BACKGROUND OF THE INVENTION

The present invention relates to an image processing device incorporated in a copier operable with a document fixed in place, printer using a stencil or similar image recording apparatus, and capable of reproducing both a sheet document and a book or similar bound document accurately. More particularly, the present invention is concerned with an image processing device capable of preventing, when a book document is spread on a glass platen, portions surrounding an image area from being reproduced and preventing an image at the bound or center portion between the right and left pages, which is raised above the glass platen, from being reproduced inaccurately.

Japanese Patent Laid-Open Publication No. 4-65973 discloses an image processing device applicable to an image recording apparatus of the type described and capable of reproducing a book or similar bound document, as follows. To begin with, a document reading unit reads a book spread on a glass platen by prescanning it, thereby producing an image signal. The device discriminates the black surrounding portion, or frame portion, and the image portions by binarizing them with a threshold value. Further, the device identifies the center or bound portion between the right and left pages of the spread document which is raised above the glass platen (sometimes referred to as a book center portion hereinafter). Such identified portions of the book are once written to an image data memory. These portions are sequentially read out of the memory in synchronism with an image signal resulting from main scanning. Part of the image signal representative of the black frame portion is replaced with a white signal to delete the frame portion. Part of the image signal representative of the book center portion, which is defaced in black and difficult to reproduce, is replaced with a photographic processing signal to reproduce it to a certain degree. The other parts are replaced with an ordinary bilevel image signal. A threshold value for discriminating the image portions and the frame portion is produced from the image signal derived from prescanning, while a threshold value for binarizing the image signal is produced from the image signal derived from main scanning. The two threshold values are selectively set in a single comparator.

The conventional procedure described above has some problems left unsolved, as enumerated below.

(1) The frame portion, image areas, and book center portion are identified, once written to the image data memory, and then read out of the memory, as stated above. An image data memory having a large capacity is needed and increases the cost of the device, even if the image signal is slightly thinned. Moreover, the prescanning step increases the period of time necessary for the first page of the document to be printed (referred to as a first printing time hereinafter).

(2) Assume that a book document is spread on the glass platen of the image reading device and read by being pressed by the operator. Then, it is likely that the position of the book differs from the time for prescanning to the time for main scanning. This would prevent the expected image of the book from being reproduced or would cause the frame portion of the book, which should be deleted, to be reproduced in black.

(3) The two threshold values to be selectively set in a single comparator are not attainable without resorting to prescanning, again increasing the first printing time.

(4) To discriminate the frame portion and the image area of the document by the threshold values, it is necessary that the cover plate of the image reading unit be at least more black than the document. Hence, even when an ordinary sheet document, as distinguished from a book document, is laid on the glass platen, the portion surrounding the document, i.e., frame portion is black. As a result, it is necessary to execute processing for deleting the frame portion by identifying the image area and the frame portion when the sheet document is laid on the glass platen. However, the prerequisite with the identification of the frame portion is that the edge portions of the document be entirely left blank. If any image is present in the edge portions of the document, it is likely that the edge portions are erroneously identified as part of the frame portion and deleted. In addition, since the cover plate is more black than the document, punch holes or similar holes formed in the document are reproduced in black.

(5) Furthermore, the conventional device discriminates the frame portion and book center portion of the document from the image area and then substitutes a white signal for parts of the image signal representative of such portions, thereby deleting the two portions. Therefore, the regions determined to be the frame portion and book center portion are replaced with a white signal in their original sizes. In this condition, black undeleted portions are apt to appear around the document due to the deviation between the frame portion and book center portion and the image portion, which is attributable to the size of a unit area for discrimination, and slight area discrimination errors.

SUMMARY OF THE INVENTION

It is, therefore, an object of the present invention to provide an image processing device for a copier, stencil printer or similar image recording apparatus which reproduces both a sheet document and a book or similar bound document accurately.

It is another object of the present invention to provide an image processing device for the above application which prevents, when a book document is spread on a glass platen, expected image portions from being deleted and prevents the frame portion, punch holes and so forth, which may be deleted, from being reproduced in black.

It is another object of the present invention to provide an image processing device for the above application which reduces the first printing time.

It is another object of the present invention to provide an image processing device for the above application which eliminates the operator's erroneous operation and enhances easy manipulation.

In accordance with the present invention, a device for processing a signal representative of a document image from a document reading unit to thereby reproduce the document image is disclosed. A first comparator binarizes a multilevel image signal from the document reading unit with a first threshold value to thereby output a first bilevel image signal. A second comparator binarizes the multilevel image signal from the document reading unit with a second threshold value to thereby output a second bilevel image signal. An area discriminating circuit outputs, in response to the second bilevel image signal from the second comparator, an area discriminate signal representative of the inside and or outside of an image area of the document image. An area separating circuit for outputs, in response to the area discriminate signal and first bilevel image signal, an image signal representative of only an image portion of the first bilevel image signal which corresponds to the area discriminate signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
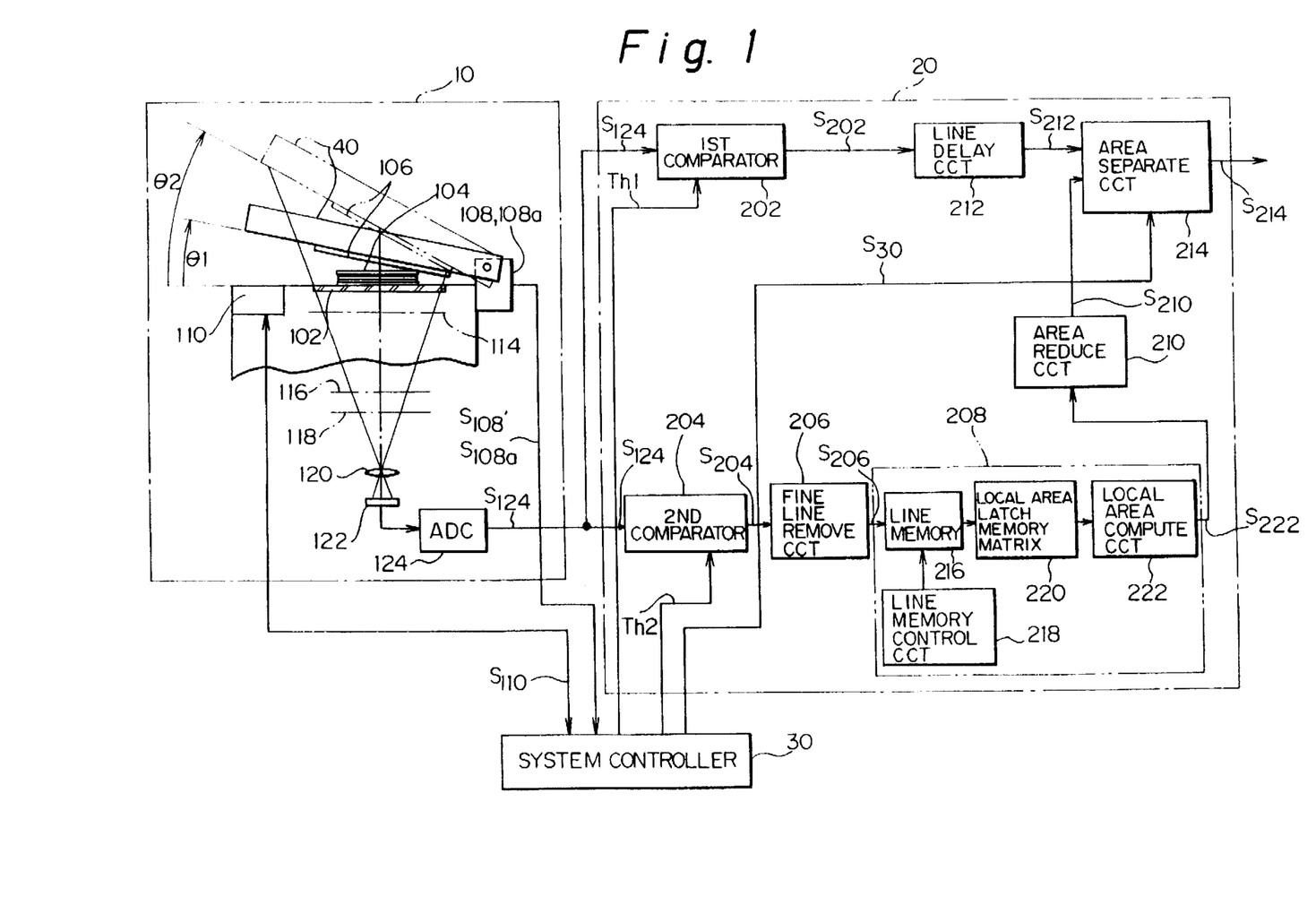
FIG. 1 is a block diagram schematically showing an image processing device embodying the present invention, together with a document reading unit.

Referring to FIG. 1 of the drawings, an image processing device embodying the present invention is shown which is applicable to, but not limited to, a copier of the type reading a document fixed in place or a printer using a stencil. As shown, a document reading unit 10 has a glass platen 102 on which a document, e.g., a book 104 is laid in a spread position. A cover plate 106 covers the document 104 on the glass platen 102. A support mechanism, not shown, supports the cover plate 106 in an open position having an angle greater than a first predetermined angle and smaller than a second predetermined angle which is greater than the first angle. Specifically, when the operator opens the cover plate 106 and then releases it, the support mechanism holds the cover plate 106 in the above-mentioned angular position due to the balance between the force of a biasing mechanism and the weight of the cover plate 106. An angle sensor 108 determines whether or not the cover plate 106 is held in the position whose angle is greater than the first angle and smaller than the second angle. If the cover plate 106 is held in such a position, the resulting output $S_{108}$ of the angle sensor 108 is sent to a system controller 30.

A key for entering a read start command is provided on an operation panel 110. A read start command $S_{110}$ is sent from this key to the system controller 30. In response, the system controller 30 causes the reading unit 10 to start reading the book 104 spread on the glass platen 102. If the angular position of the cover plate 106 does not lie in the range between the first and second angles, which are respectively labeled θ1 and θ2, as indicated by the output $S_{108}$ of the angle sensor 108, the system controller 30 causes the operation panel 110 to display an alarm message showing the operator that the angle of the cover plate 106 is not adequate. An arrangement may be made such that when the angle of the cover plate 106 does not lie in the range of from θ1 to θ2, the system controller 30 inhibits the reading unit 10 from reading the book 104 despite the read start command $S_{110}$ which may be entered on the operation panel 110.

A light source 112 (see FIG. 6A) illuminates the book 104 laid on the glass platen 102 from below the glass platen 102. The resulting reflection from the book 104 is routed through a first mirror 114, a second mirror 116, a third mirror 118 and a lens 120 to an image sensor 122 implemented by CCDs (Charge Coupled Devices). The image sensor 122 converts the incident light to a corresponding electric signal. Specifically, scanning optics, carrying the light source 112 and mirrors 114–118 thereon, is moved to scan the book 104 in the vertical or subscanning direction while the image sensor 122 scans it in the horizontal or main scanning direction. An image signal representative of the book 104 is applied to an analog-to-digital converter (ADC) 124 to be converted to a multi-level digital image signal $S_{124}$ thereby. In FIG. 1, the reference numeral 40 designates an ADF (Automatic Document Feeder).

The image signal $S_{124}$ from the ADC 124 is sent to an image processing section, i.e., an image processing device 20 embodying the present invention. The image processing device 20 is made up of a first and a second comparator 202 and 204, respectively, a fine line removing circuit 206, an area discriminating circuit 208, an area reducing circuit 210, a line delay circuit 212, and an area separating circuit 214. The system controller 30 provides the first and second comparators 202 and 204 with a first and a second threshold value Th1 and Th2, respectively. The first comparator 202 binarizes the image signal $S_{124}$ from the ADC 124 by use of the first threshold value Th1, thereby producing a bilevel image signal $S_{202}$. This signal $S_{202}$ is applied to the line delay circuit 212. On the other hand, the second comparator 204 binarizes the image signal $S_{124}$ by use of the second threshold value Th2 in order to determine a document area. The bilevel output of the comparator 204, i.e., a document area signal $S_{204}$ is fed to the fine line removing circuit 206. Assuming that the image signal $S_{124}$ has a level "0" representative of white and a level "255" representative of black, then the first and second threshold values Th1 and Th2 may be selected to be "128" and "64", respectively (see FIGS. 3B and 6B).

Figure 6A:
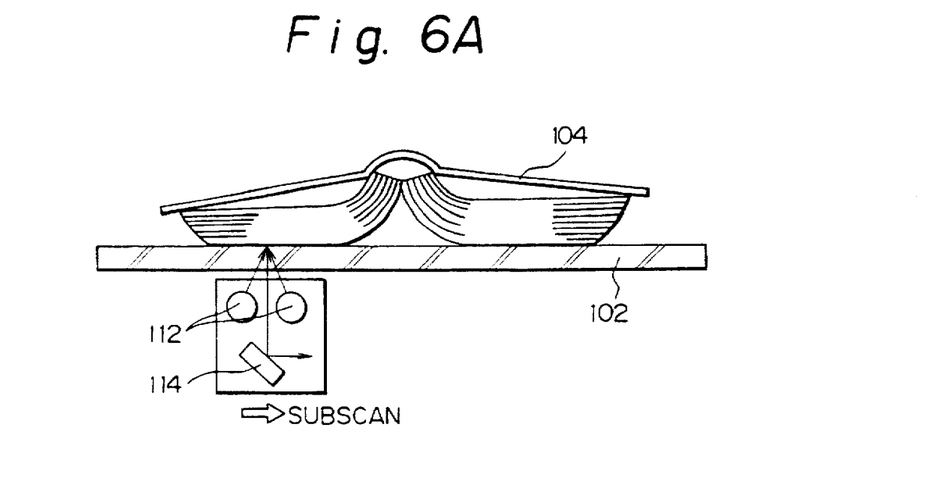
FIGS. 6A and 6B demonstrate the operation of a second comparator also included in the embodiment.
Figure 6B:
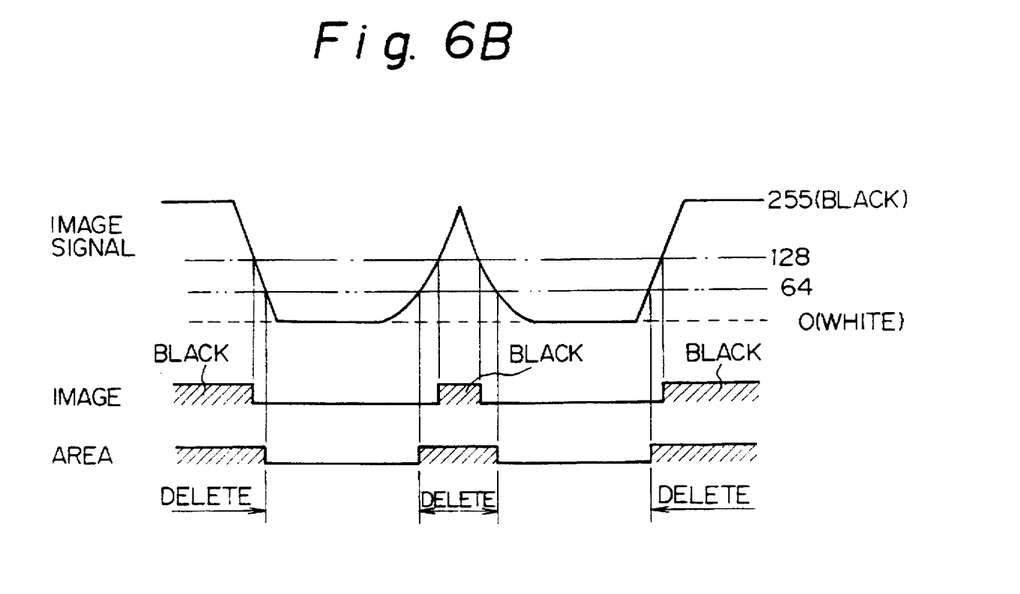

In FIG. 6B, AREA is representative of areas surrounding the document 104 as determined by the second comparator 204 by binarization, while IMAGE is representative of black images as determined by the first comparator 202 by binarization. The areas AREA around the document 104 are deleted, as will be described later specifically. If the areas AREA indicated by hatching in FIG. 6B are broader than the areas IMAGE also indicated by hatching in the figure, the portions of the book 104 raised away from the glass platen 102 will be prevented from being reproduced as black smears (this is entirely different from the recognition of areas). In the light of this, the second threshold value Th2 is selected to be smaller than the first threshold value Th1.

Figure 2A:
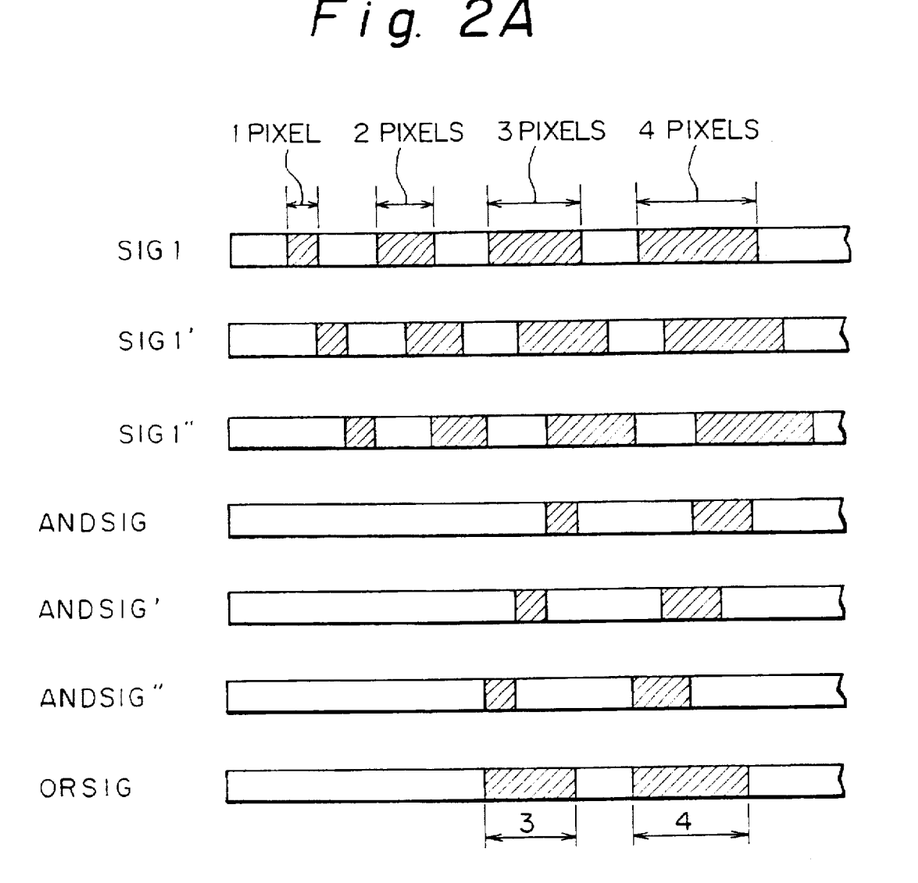
FIGS. 2A and 2B demonstrate the operation of a fine line removing circuit included in the embodiment.
Figure 2B:
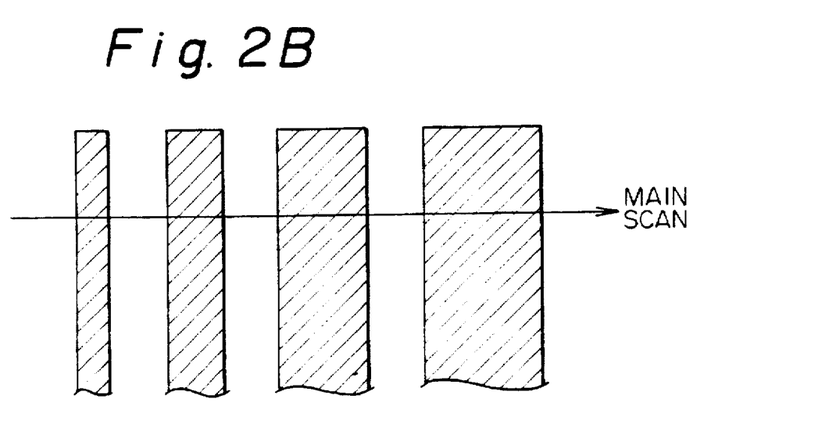

On receiving the document area signal $S_{204}$ from the second comparator 204, the fine line removing circuit 206 removes fine lines thinner than a predetermined width, as follows. In the illustrative embodiment, the circuit 206 removes such thin lines by skeletonizing a bilevel image with an AND gate circuit and fatting it with an OR gate circuit, as is conventional. FIG. 2B shows specific line images printed on the document 104 and respectively having widths of one pixel, two pixels, three pixels, and four pixels. The reading device 10 reads such line images and outputs a corresponding image signal SIG1 shown in FIG. 2A. As shown in FIG. 2A, the circuit 206 shifts, or delays, the image signal SIG1 one pixel to the right to produce a signal SIG1', and then shifts the signal SIG1' one pixel to the right to produce a signal SIG1". Subsequently, the circuit 206 ANDs the three signals SIG1, SIG1' and SIG1" to output a signal ANDSIG. As shown, the line images, which are respectively one pixel wide and two pixels wide, are absent in the signal ANDSIG. While the line images which are three pixels wide and four pixels wide are present in the signal ANDSIG, they are reduced in width. Such a skeletonizing procedure is followed by a fatting procedure. Specifically, the circuit 206 shifts the signal ANDSIG one pixel to the left to produce a signal ANDSIG', and then shifts the signal ANDSIG' one pixel to the left to produce a signal ANDSIG". Thereafter, the circuit 206 ORs the three signals ANDSIG, ANDSIG' and ANDSIG", thereby producing a signal ORSIG. In this signal ORSIG, the line images have regained their original widths.

The fine line removing circuit 206 is capable of removing fine lines not only in the main scanning direction but also in the subscanning direction. However, since the removal of fine lines in the subscanning direction needs a line memory, the embodiment omits it from the cost standpoint. In practice, fine lines thinner than about 1 mm should be removed.

Figure 3A:
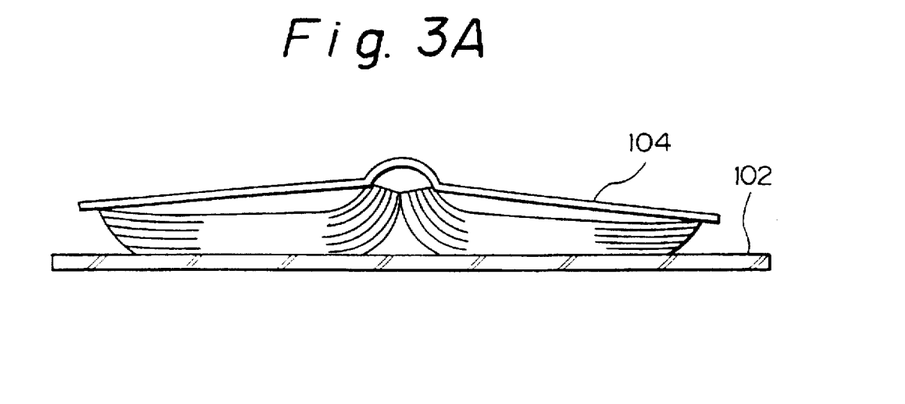
FIGS. 3A and 3B are views representative of the operation of the embodiment for reading a book document spread on a glass platen.
Figure 3B:
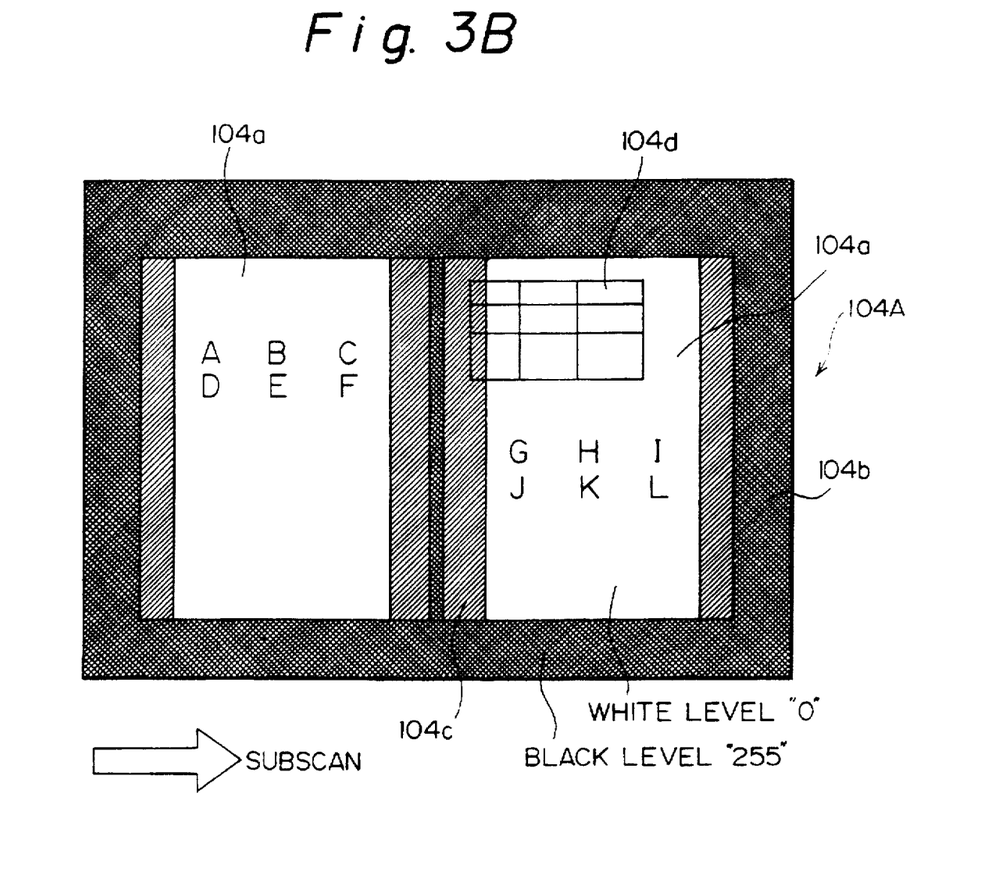

The output signal $S_{206}$ of the fine line removing circuit 206 is applied to the area discriminating circuit 208 which discriminates the inside and the outside of a document image. The discriminating circuit 208 has a line memory 216, a line memory control circuit 218, a local area latch memory matrix 220, and a local area computing circuit 222. As shown in FIG. 3A, the book 104 is spread on the glass platen 102 and scanned by the reading unit 10. As shown in FIG. 3B, the image 104A read by the reading unit 10 consists of image areas 104a corresponding to the right and left pages of the spread book 104, a black frame portion 104b representative of portions surrounding the book 104, and a gray center portion 104c representative of the center or bound portion of the book 104.

The output signals $S_{206}$ of the fine line removing circuit 206 are sequentially written to the line memory 216 under the control of the line memory control circuit 218. The line memory 216 stores a plurality of lines of image signals. The local area latch memory matrix 220 latches, among the image signals stored in the line memory 216, image signals representative of a local area or matrix which is sized, for example, three pixels by three pixels. The local area computing circuit 222 discriminates the inside and t h e outside of the image areas 104a by performing calculations with the image signals latched by the matrix 220.

The local area computing circuit 222 executes, for example, a procedure as taught in, for example, U.S. Pat. No. 4,947,158 corresponding to Japanese Patent Laid-Open Publication No. 63-223785. Briefly, this procedure sequentially paints the inside of a document appearing on a black background surrounding it. The prerequisite with such a procedure is that the edge portions of a document be constituted by white blanks. Should an image extend as far as the edge portions of a document, the image would merge into the black portions surrounding the document and, therefore, white present in the inside of the document would not turn out a closed figure. It is to be noted that lines thinner than a predetermined width (about 1 mm) may be written in the edge portions of a document since they will be removed by the fine line removing circuit 206. The circuit 222 determines whether or not to paint a closed figure pixel by pixel. The line memory 216 stores a plurality of lines of image signals including pixels to process at all times, while the local area latch memory matrix 220 holds, among such image signals, image signals representative of, for example, a three pixels by three pixels area (i.e. one pixel to process and eight pixels surrounding it). If the pixel to process is white, the circuit 222 leaves it as it is. Assume that the pixel of interest is black. Then, if the pixel positioned at the right or the upper right is white and the pixel positioned at the left or the lower left is white, the circuit 222 changes the pixel of interest to white. The circuit 222 repeats such a procedure with each pixel.

Figure 4A:
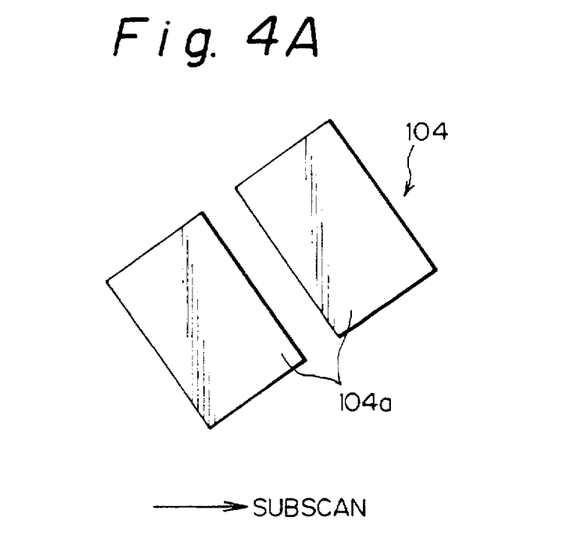
FIGS. 4A and 4B are plan views each showing a specific document area which may be identified by area discrimination particular to the embodiment.
Figure 4B:
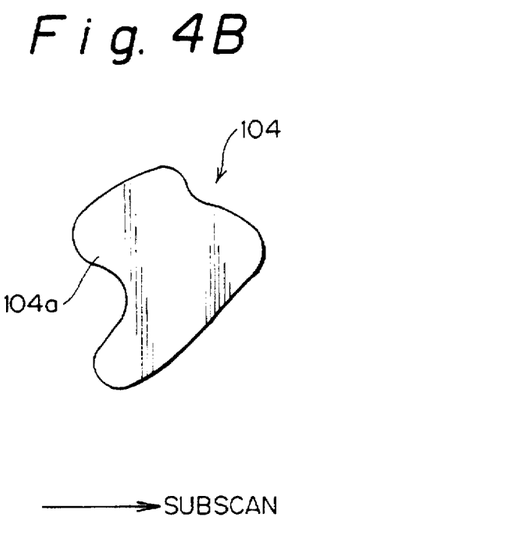

As shown in FIG. 3B, assume that rules 104d existing in the document area 104a extend into the book center portion 104c. In this condition, the image overlapping the book center portion 104c is unavoidably deleted by the binarization effected by the second comparator 204. However, the fine line removing circuit 206 prevents even the portions of the rules 104d contacting the glass platen 102 from being identified as the portions around the document 104 and deleted. Further, the closed figure to be selectively painted by the local area computing circuit 222 may be set with some freedom. Hence, the image areas 104a can be identified correctly even when the book 104 is positioned obliquely, as shown in FIG. 4A, or when it has an irregular contour, as shown in FIG. 4B. The result of such a painting procedure is fed from the local area computing circuit 222 to the area reducing circuit 210 as an inside signal $S_{222}$.

The area reducing circuit 210 reduces, or curtails, the image areas 104a identified by the discriminating circuit 208 inwardly from the boundary over a predetermined width. The reduction is done by inverting the skeletonization of the fine line removing circuit 206 with respect to black and white. Specifically, it is likely that black undeleted portions are left around the document image due to the deviation between the frame portion 104b and book center portion 104c and the image areas 104a, which is attributable to the size of a unit area to be processed by the discriminating circuit 208, and unnoticeable discrimination errors. The area reducing circuit 210 reduces this problem by curtailing the image areas 104a, i.e., by deleting the frame portion 104b and book center portion 104c more than expected. However, if the circuit 210 reduces the image areas 104a excessively, it will delete even the image which should be reproduced and will need an expensive line memory. In practice, therefore, the image areas 104a should preferably be reduced by about 0.3 mm to about 1.5 mm. The circuit 210 applies the result of reduction to the area separating circuit 214 as a reduced area signal $S_{210}$.

The reduced area signal $S_{210}$ output from the area reducing circuit 210 is delayed a predetermined number of lines, compared to the bilevel image signal $S_{202}$ output from the first comparator 202. This is because the line memory 216 delays the area signal $S_{204}$ from the second comparator 204 at some locations due to the processing particular thereto. In the light of this, the bilevel signal $S_{202}$ from the comparator 202 is delayed by the line delay circuit 212 to match the reduced area signal $S_{210}$ in position. As a result, the line delay circuit 212 produces a delayed bilevel image signal $S_{212}$. The reduced area signal $S_{210}$ and delayed bilevel image signal $S_{212}$ are fed to the area separating circuit 214.

The system controller 30 sends an area separation command $S_{30}$ to the area separating circuit 214. In response, the area separating circuit 214 separates the area represented by the reduced area signal $S_{210}$ from the area represented by the delayed bilevel image signal $S_{212}$, thereby deleting the black frame portion 104b and book center portion 104c of the book 104. A bilevel image signal $S_{214}$ representative of the curtailed image is sent from the circuit 214 to a printer section included in a copier, a master making section included in a stencil printer, or similar recording section to be printed on a medium thereby. On the other hand, when the area separation command $S_{30}$ from the system controller 30 does not appear, the circuit 214 directly transfers the delayed bilevel image signal $S_{212}$ from the line delay circuit 212 to the recording section. Further, as shown in FIG. 1, an open/close sensor 108a is provided integrally with or independently of the previously mentioned angle sensor 108 and outputs a signal S108a indicative of whether or not the cover plate 106 is closed. When the cover plate 106 is closed as determined by the sensor 108a, the system controller 30 automatically sends an area separation command $S_{30}$ to the area separating circuit 214 so as to cause it to execute the expected function.

Assume that a document is in the form of a sheet document 126 (see FIG. 5), as distinguished from the book document 104. Then, while the cover plate 106 may be left open when the reading unit 10 reads the sheet document 126, it is usually closed. In this case, the system controller 30 does not send an area separation command $S_{30}$ to the area separating circuit 214. As a result, the delayed bilevel image signal $S_{212}$ from the line delay circuit 212 is simply transferred via the separating circuit 214. Consequently, even the portions of the cover plate 106 surrounding the sheet document 126 are read and reproduced, depending on the combination of paper size, document size, and reduction ratio. This will not matter at all so long as the cover plate 106 is clean. However, when the cover plate 106 is smeared, the smear itself will be reproduced as an image. Particularly, an ADF is mounted on most image reading units available today. When mounted on a reading unit of the type reading a document fixed in place, the ADF is constructed to convey a sheet document to a glass platen with a belt. The problem with this type of ADF is that the belt is unavoidably smeared since it drags a sheet document along the glass platen. Although the smears on the belt may not be critical in the electrophotographic copiers art, they are critical when it comes to a printer of the type using a cut stencil or master. While the cover plate may, of course, be painted black beforehand, the cover plate 106 of the embodiment is colored white or similar color.

Figure 5:
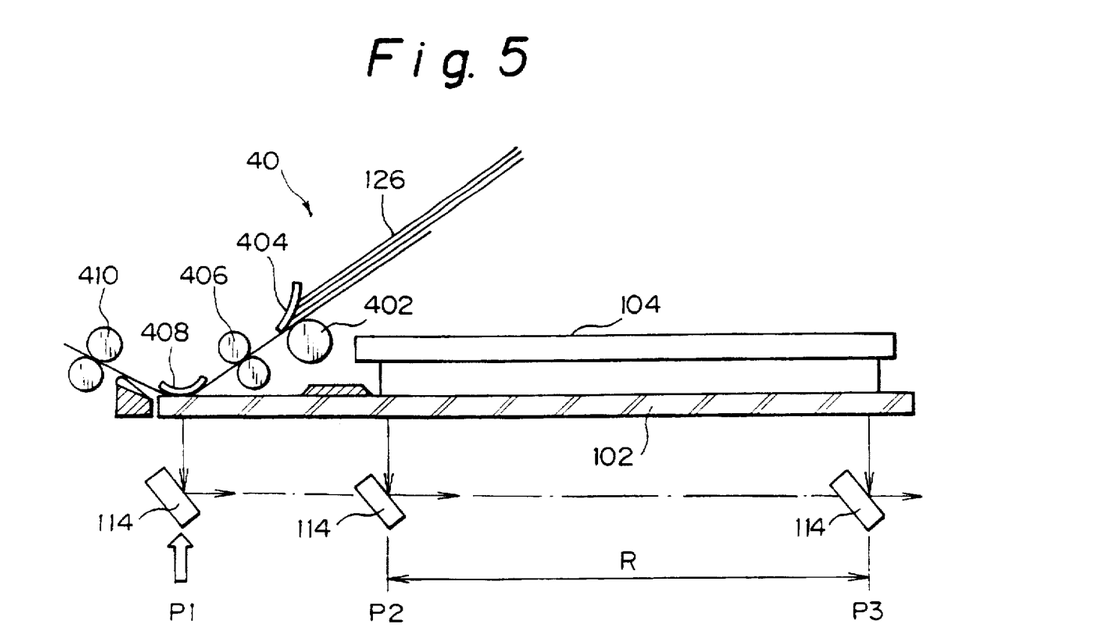
FIG. 5 is a section of an image reading unit applicable to the embodiment and operable as a two-mode scanner.

The illustrative embodiment reduces the contamination of the cover plate 106 by inhibiting the automatic feed of the sheet document 126 which is the greatest cause of contamination. Specifically, as shown in FIG. 5, the reading unit 10 is implemented as a two-mode scanner selectively operable, under the control of the system controller 30, in a mode for reading a document while conveying it when the ADF 40 is used or a mode for reading a document fixed in place. When the ADF 40 is used, the optics made up of the elements 112, 114, 116 and 118, as shown in FIGS. 1 and 6A, is moved to an ADF read position, i.e., the first mirror 114 is moved to a position P1 shown in FIG. 5. In this position, the optics reads the sheet document 126 while the ADF 40 conveys it, i.e., scans it in the subscanning direction. At this instant, a pick-up roller 402 and a separating member 404 feed one sheet document 126 while separating it from the others. The sheet document 126 is conveyed by a conveyor roller pair 406 and then driven out by a discharge roller pair 410 via the position P1 between the glass platen 102 and the cover plate 408. When the sheet document 126 is sequentially moved via the position P1, it is illuminated by the light source 112. The resulting imagewise reflection from the sheet document 126 is routed through the mirrors 114–118 and lens 120 to the CCD image sensor 122, as stated earlier. In this way, in the ADF mode, the reading unit 10 reads the sheet document 126 being moved, while holding the optics in a halt.

When the ADF 40 is not used, the document 126 is laid on the glass platen 102. As the light source 112 illuminates the document 126, a reflection from the document 126 is also routed through the mirrors 114–118 and lens 120 to the CCD image sensor 122. At this instant, the optics is moved in the subscanning direction over a range R. In this case, the first mirror 114 is moved between a position P2 and a position P3 shown in FIG. 5.

As described above, the illustrative embodiment achieves various unprecedented advantages, as enumerated below.

(1) As the document reading device 10 generates a multilevel image signal, the first comparator 202 binarizes it with a first threshold value to produce a bilevel image signal. The second comparator 204 binarizes the multilevel image signal with a second threshold value to produce an area signal. The document area discriminating circuit 208 produces an inside signal from the area signal. The area separating circuit 214 separates only a portion of the bilevel image signal which matches the inside signal. Such a procedure eliminates the need for a prescanning step and a video memory having a great capacity and, therefore, reduces the cost and previously discussed first printing time. When the book 104 is spread on the glass platen 102 and read by being pressed by the operator, therefore, such an elimination of the prescanning step can prevent an occurrence that the position of the book 104 is changed from the time for prescanning to the time for main scanning to cause the expected image thereof to be deleted or the surrounding portions to be reproduced in black.

(2) The second comparator 204 is exclusively assigned to the identification of a document area. This, coupled with the function of the first comparator 202, allows an optimal second threshold value to be set. Hence, accurate identification of a document area is achievable without resort to a prescanning step, so that the first printing time is reduced.

(3) The cover plate 106 is colored white or similar color. Therefore, when the document is a sheet document, the portions surrounding the document are white, so that processing for discriminating the document area is not necessary. This allows the image of a sheet document to be directly reproduced even though it may extend as far as the edges of the document. When the document is a book, the cover plate 106 is raised and cannot be read in pure white with the result that the portions surrounding the book are reproduced in black. In such a case, by opening the cover plate 106, it is possible to provide a sufficient distance between the area of the cover plate 106 around the book and the optics for illumination. In this condition, the area around the book is deleted to appear white by the document area discrimination and, therefore, prevented from appearing in black on a reproduction. In this way, since the cover plate 106 is painted white or similar color, both a sheet document and a book document can be accurately reproduced. Even when the document has punch holes, the holes are not reproduced in black.

(4) The open/close sensor 108a determines whether or not the cover plate 106 is closed. In response to the output of the sensor 108a, the system controller 30 sends an area separation command to the area separating circuit 214 in order to cause it to effect area separation automatically. The operator, therefore, does not have to select a particular mode matching a sheet document or a book document. This enhances efficient manipulation and eliminates erroneous operation.

(5) To read a book document, it is necessary to open the cover plate 106 more than a predetermined angle. When the angular position of the cover plate 106 is lower than predetermined one, the device produces an alarm message or inhibits the reading unit 10 from starting to read the document. This prevents the cover plate 106 from being inadvertently lowered excessively. On the other hand, when the cover plate 106 is opened excessively, extraneous light, e.g., light from an overhead lamp will be directly incident to the reading unit 10 and prevent the area around the document from being read in pure black. However, when the cover plate 106 is opened to an angular position above the second predetermined angular position, the apparatus produces an alarm message or inhibits the reading unit 10 from starting to read the document. This prevents the cover plate 106 from being raised excessively.

(6) When a book document has lines extending from the edges thereof, a conventional device has erroneously identified the document area and deleted the desired image. In the illustrative embodiment, the fine line removing circuit 206 removes fine lines thinner than a predetermined width from the bilevel image signal input to the area discriminating circuit 208. Hence, the document area can be discriminated correctly, i.e., lines at the edges of a book document can be reproduced without being deleted. Although an image having a substantial width may exist at any edge of a book document, most images extending as far as the edge of a book document are considered fine lines.

(7) Assume that a document area is identified and simply transferred to the area separating circuit 214 in the original size thereof. Then, black undeleted portions will be left around the document due to the deviation between the frame portion and book center portion and the image area, which is attributable to the size of a unit area for discrimination, and unnoticeable discrimination errors. In the embodiment, the area reducing circuit 210 reduces, or curtails, the area of the inside signal, which has been discriminated by the area discriminating circuit 208, inwardly from the boundary. This is successful in deleting the undesirable black portions around the document. Preferably, the circuit 210 should reduce the area about 0.3 mm to about 1.5 mm, although it depends on the image density and the unit size for area discrimination.

(8) Smears on the cover plate 106 would be reproduced together with a document. In the embodiment, the reading unit 10 serves, when the ADF 40 is used, as a scanner for reading a document being moved or, when it is not used, as a scanner for reading a document laid on the glass platen 102. Hence, the cover plate 106 is maintained white and eliminates an occurrence that the smears thereof are reproduced.

In summary, it will be seen that the present invention provides an image processing device capable of reproducing not only the image of a sheet document but also the image of a book document accurately. Further, when a book document is spread on a glass platen, the device of the present invention prevents the expected image portions of the document from being deleted and prevents the frame portion around the document, as well as punch holes, from being undesirably reproduced in black.

Various modifications will become possible for those skilled in the art after receiving the teachings of the present disclosure without departing from the scope thereof.

What is claimed is:

1. A device for processing a signal representative of a document image from a document reading unit to thereby reproduce said document image, said device comprising:

first binarizing means for binarizing a multilevel image signal from the document reading unit with a first threshold value to thereby output a first bilevel image signal;

second binarizing means for binarizing the multilevel image signal from the document reading unit with a second threshold value to thereby output a second bilevel image signal wherein the second threshold value is lower than a threshold value used to discriminate character images;

area discriminating means for automatically outputting, in response to said second bilevel image signal from said second binarizing means, an area discriminate signal representative of at least one of an inside and an outside of an image area of the document image;

area reducing means for outputting, in response to said area discriminate signal, a reduced area discriminate signal representative of a reduced image area of the document image wherein the reduced image area comprises an image portion of the image area of the document image; and area separating means for outputting, in response to said reduced area discriminate signal and said first bilevel image signal, an image signal representative of only the image portion of said first bilevel image signal which corresponds to the inside of the reduced image area based on said reduced area discriminate signal.

2. A device as claimed in claim 1, wherein said first binarizing means and said second binarizing means comprise a first and a second comparator, respectively.

3. A device as claimed in claim 1, wherein said area discriminating means comprises:

a line memory for storing a plurality of lines of bilevel image signals included in said second bilevel image signal from the second binarizing means and outputting a local area bilevel image signal;

a line memory control circuit for controlling said line memory;

a local area latch circuit for latching the local area bilevel image signal output from said line memory; and a local area computing circuit for outputting said area discriminate signal by performing calculations with said local area bilevel image signal latched by said local area latch circuit.

4. A device as claimed in claim 1, wherein said first threshold value is greater than said second threshold value.

5. A device as claimed in claim 1, wherein the document reading unit has a cover plate of white or similar color, wherein when said cover plate is opened said area discriminating means executes discrimination.

6. A device as claimed in claim 5, further comprising first sensing means for determining whether the cover plate is in an open position or in a closed position, and system controller means for controlling the device, said area separating means automatically separating said image portion in response to an output of said first sensing means and an output of said system controller means.

7. A device as claimed in claim 6, further comprising second sensing means for sensing an angular position of the cover plate, wherein when said cover plate is opened to an angular position below a first predetermined angular position or above a second predetermined angular position, said device produces an alarm message or inhibits the document reading unit from starting to read a document.

8. A device as claimed in claim 1, further comprising fine line removing means for removing fine lines thinner than a predetermined width from said second bilevel image signal input to said area discriminating means.

9. A device as claimed in claim 1, wherein the document reading unit comprises a two-mode scanner for reading, when an automatic document feeder is used, a document while conveying the document or for reading the document fixed in place when said document is laid on a glass platen and an automatic document feeder is not used.

10. A device as claimed in claim 1, wherein said area reducing means reduces the document image area by a predetermined amount.

11. A device for processing a signal representative of a document image from a document reading unit to thereby reproduce said document image, said device comprising:
a first comparator for binarizing a multilevel image signal from the document reading unit with a first threshold value to thereby output a bilevel image signal;
area discriminating means comprising a line memory for storing a plurality of lines of bilevel image signals and outputting a local area bilevel image signal, a line memory control circuit for controlling said line memory, a local area latch circuit for latching the local area bilevel image signal output from said line memory, and a local area computing circuit for automatically outputting an area discriminate signal representative of at least one of an inside and an outside of an image area of the document image by performing calculations with said local area bilevel image signal latched by said local area latch circuit;
area reducing means for outputting, in response to said area discriminate signal, a reduced area discriminate signal representative of a reduced image area of the document image wherein the reduced image area comprises an image portion of the image area of the document image; and
area separating means for outputting, in response to said area discriminate signal and said bilevel image signal from the first comparator, an image signal representative of only an image portion of said bilevel image signal which corresponds to the inside of the image area based on said area discriminate signal or outputting, in response to said reduced area discriminate signal and said bilevel image signal, an image signal representative of only an image portion of said bilevel image signal which corresponds to the inside of the reduced image area based on said reduced area discriminate signal.

12. A device as claimed in claim 11, further comprising a second comparator for binarizing said multilevel image signal with a second threshold value smaller than said first threshold value to thereby output a document area signal.

13. A device as claimed in claim 11, wherein the document reading unit has a cover plate of white or similar color, wherein when said cover plate is opened said area discriminating means executes discrimination.

14. A device as claimed in claim 13, further comprising first sensing means for determining whether the cover plate is in an open position or in a closed position and system controller means for controlling the device, said area separating means automatically separating said image portion in response to an output of said first sensing means and an output of said system controller means.

15. A device as claimed in claim 14, further comprising second sensing means for sensing an angular position of the cover plate, wherein when said cover plate is opened to an angular position below a first predetermined angular position or above a second predetermined angular position, said device produces an alarm message or inhibits the document reading unit from starting to read a document.

16. A device as claimed in claim 11, further comprising fine line removing means for removing fine lines thinner than a predetermined width from said bilevel image signal input to said line memory of said area discriminating means.

17. A device as claimed in claim 11, wherein the document reading unit comprises a two-mode scanner for reading, when an automatic document feeder is used, a document while conveying the document or for reading the document fixed in place when said document is laid on a glass platen and the automatic document feeder is not used.

18. A device for processing a document image signal from a document reading unit to thereby reproduce said document image, said device comprising:
area discriminating means for automatically outputting, in response to said document image signal from said document reading unit, an area discriminate signal representative of at least one of an inside and an outside of an image area of the document image;
area reducing means for outputting, in response to said area discriminate signal, a reduced area discriminate signal representative of a reduced image area of the document image wherein the reduced image area comprises an image portion of the image area of the document image;
area separating means for outputting, in response to said area discriminate signal and said document image signal, an image signal representative of only an image portion of said document image signal which corresponds to the inside of the image area based on said area discriminate signal or outputting, in response to said reduced area discriminate signal and said document image signal, an image signal representative of only the image portion of said document image signal which corresponds to the inside of the reduced image area based on said reduced area discriminate signal; and
the document reading unit having a cover plate of white or similar color such that when said cover plate is opened said area discriminating means executes discrimination.

19. A device as claimed in claim 18, further comprising first sensing means for determining whether the cover plate is in an open position or in a closed position and system controller means for controlling the device, said area separating means automatically separating said image portion in response to an output of said first sensing means and an output of said system controller means.

20. A device as claimed in claim 19, wherein when said cover plate is closed, said system controller means is configured so as to keep said area separating means from performing separation of said image portion.

21. A device as claimed in claim 19, further comprising second sensing means for sensing an angular position of the cover plate, wherein when said cover plate is opened to an angular position below a first predetermined angular position or above a second predetermined angular position, said device produces an alarm message or inhibits the document reading unit from starting to read a document.

22. A device as claimed in claim 18, wherein the document reading unit comprises a two-mode scanner for reading, when an automatic document feeder is used, a document while conveying the document or for reading the document fixed in place when said document is laid on a glass platen and the automatic document feeder is not used.

23. A device for processing a document image signal from a document reading unit to thereby reproduce said document image, said device comprising:
area discriminating means for automatically outputting, in response to said document image signal from said document reading unit, an area discriminate signal representative of at least one of an inside and an outside of an image area of the document image;

area reducing means for outputting, in response to said area discriminate signal, a reduced area discriminate signal representative of a reduced image area of the document image wherein the reduced image area comprises an image portion of the image area of the document image; and area separating means for outputting at least one of a first image signal representative of only an image portion of said document image signal which corresponds to the inside of the image area based on said area discriminate signal and a second image signal representative of only the image portion of said document image signal which corresponds to the inside of the reduced image area based on said reduced area discriminate signal, said first image signal being outputted in response to said discriminate signal and said document image signal and said second image signal being outputted in response to said reduced area discriminate signal and said document image signal;

the document reading unit having a cover plate of white or similar color such that when said cover plate is opened said area discriminating means executes discrimination.

* * * * *

UNITED STATES PATENT AND TRADEMARK OFFICE
CERTIFICATE OF CORRECTION

PATENT NO. : 5,790,262

DATED : AUGUST 4, 1998

INVENTOR(S): HIROSHI KANNO

It is certified that an error appears in the above-identified patent and that said Letters Patent is hereby corrected as shown below:

Column 4, line 37, delete "Th2may" and insert --Th2 may--.

Column 5, line 44, delete "t h e" and insert --the--.

Signed and Sealed this

Fifteenth Day of June, 1999

Attest:

Q. TODD DICKINSON

*Attesting Officer*   *Acting Commissioner of Patents and Trademarks*